Jan. 8, 1963 T. F. TOLBY ET AL 3,072,270
DISPOSABLE CARGO CUSHION
Filed Feb. 20, 1959
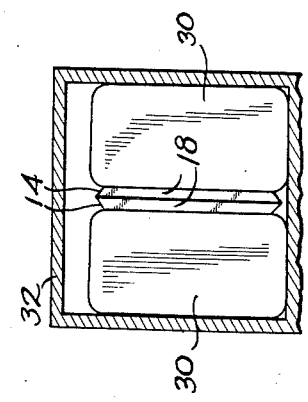
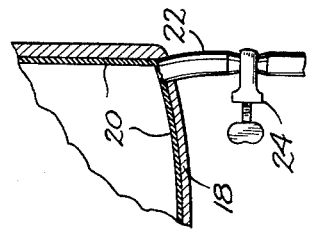
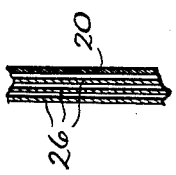
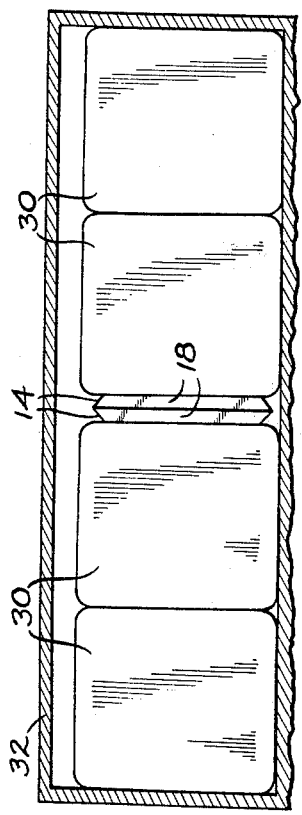
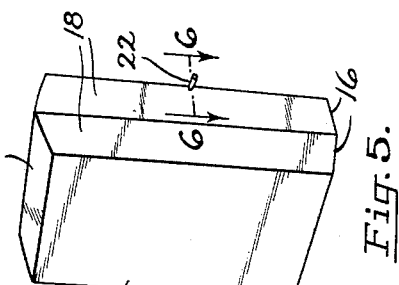
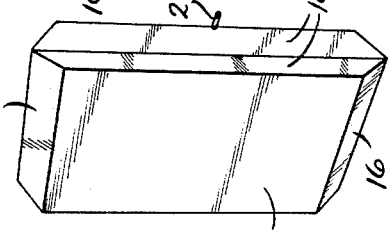
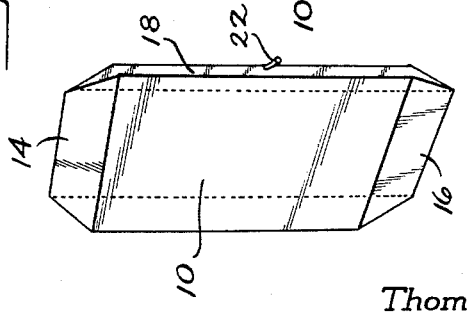
Thomas F. Tolby
Harold E. Leach
INVENTORS
BY *Oliver D. Olson*
Agent United States Patent Office 3,072,270
Patented Jan. 8, 1963

3,072,270
DISPOSABLE CARGO CUSHION
Thomas F. Tolby, 1855 SW. 96th Ave., Portland 25, Oreg., and Harold E. Leach, Star Route E, Newport, Oreg.
Filed Feb. 20, 1959, Ser. No. 794,693
4 Claims. (Cl. 214—10.5)

This invention pertains to the cushioning of cargo during shipment, and relates particularly to an inflatable cargo cushion which is disposable by virtue of its inexpensive construction.

In the transport of freight by rail, motor or air, it is required that the longitudinal and lateral dimensions of the freight carrying compartment be filled or bridged in order to prevent shifting of the merchandise during transport. For example, in the transport of such articles as plywood veneers, crated appliances and various other packages, it is conventional procedure to bridge the void spaces longitudinally and laterally with lumber. Although the lumber is expendable, the installation of the bridging material is time consuming and therefore costly.

Another procedure proposed heretofore is to substantially fill the void spaces laterally and longitudinally with large inflatable reinforced rubber balloons of desired shape. Some of these balloons are of unitary construction, consisting of fabric-reinforced vulcanized rubber prepared by techniques similar to the manufacture of automobile tires. Others include a rubber bladder confined within the fabric-reinforced rubber balloon casing. In either case, it is important that the fabric-reinforced rubber be of sufficient strength and thickness to confine a moderate pressure of air and to resist abrasion and puncture by the articles of merchandise.

Although these inflatable rubber cushions avoid the labor time of installation inherent in the use of lumber bridging, they present other disadvantages which render them as economically impractical as lumber. For example, the cost of materials and manufacture are so high as to render it an economic necessity that the balloons be used a great many times. This requirement necessitates the return of the balloons to the point of origin of the shipment. It has been a standard procedure for the shipper to charge the buyer with the cost of the balloons, to insure their return, and thereafter to credit the buyer for the return. This procedure not only is objectionable from the viewpoint of the buyer, but it also involves the additional expense of maintaining books of account on the balloons, by both the shipper and the buyer. Moreover, the rubber balloons are dimensionally weak and incapable of maintaining their shape, thereby requiring that they be suspended in place in a freight compartment preliminary to inflation. The provision of suspending means adds materially to the cost involved in the use of such balloons.

Accordingly, it is a principal object of the present invention to provide an inflatable cargo cushion which performs the cushioning function of the expensive rubber balloons described hereinbefore, but which avoids the excessive installation costs thereof and which is disposable after a single use.

Another important object of this invention is the provision of a disposable cargo cushion which is collapsible to minimum size for convenient storage prior to use.

Still another important object of this invention is the provision of a disposable, inflatable cargo cushion which is sufficiently rigid even before inflation, as to be manipulated with maximum facility and installed between the packages without the necessity of being suspended in place.

A further important object of this invention is the provision of a disposable, inflatable cargo cushion in which an inexpensive inflatable bladder is confined within an inexpensive, collapsible casing made of paper, cardboard, or similar inexpensive fibrous sheet material.

The foregoing and other objects and advantages of this invention will appear from the following detailed description, taken in connection with the accompanying drawing in which:

FIG. 1 is a fragmentary sectional view in side elevation of a freight car showing the same loaded with packaged merchandise and illustrating the manner of use of a disposable cargo cushion emboding features of the present invention;

FIG. 2 is a fragmentary sectional view in end elevation of the freight car shown in FIG. 1;

FIG. 3 is a perspective view of a disposable cargo cushion embodying the features of the present invention, the same being shown in collapsed condition;

FIG. 4 is a perspective view similar to FIG. 3 and showing the disposable cargo cushion in an intermediate condition of inflation;

FIG. 5 is a perspective view similar to FIGS. 3 and 4 and showing the disposable cargo cushion in a condition of further inflation;

FIG. 6 is a fragmentary sectional view taken along the line 6—6 in FIG. 5; and

FIG. 7 is a fragmentary sectional view illustrating the construction of the bladder-confining casing from a multi-wall paper bag.

In its broad concept, the disposable cargo cushion of the present invention comprises an inexpensive inflatable bladder confined within an inexpensive laterally expansible casing. The bladder may be of inexpensive, thin wall rubber or synthetic thermoplastic material such as polyethylene sheeting. If the bladder is made of polyethylene or other substantially non-elastic thermoplastic material, it is important that its dimensions when inflated be greater than the inside dimensions of the confining casing, so that the bladder is reinforced by the casing throughout its dimensions, thus to prevent localized stretching of the bladder beyond its limit of rupture.

The bladder-confining casing is formed of inexpensive fibrous sheet material, preferably paper or cardboard. A single thickness of heavy paper may be sufficient, although multi-wall paper bags are preferred for their added strength and resistance to abrasion. The paper may be reinforced by laminations of plastic sheeting, cloth, or other suitable material. If cardboard is employed, it may be of the solid type or it may be corrugated.

Where the casing is made of paper, cardboard or other fibrous sheet material, it is preferred that it be constructed from a single blank or a plurality of connected blanks folded along predetermined lines to form a transversely expansible container which is capable of being opened initially to receive the bladder therein and thereafter sealed to form a substantially closed casing. Thus, the casing may be formed in accordance with well known practices utilized in the production of paper bags and cardboard cartons, to provide any size and shape desired.

As an illustration of the type of casing suitable for use for the present invention, reference is made to FIGS. 3-6 of the drawing. The casing illustrated is formed of a single blank of heavy paper or cardboard folded along predetermined lines to produce a casing structure which includes the face panels 10 and 12, the outwardly folding top and bottom walls 14 and 16, respectively, and the inwardly folding side walls 18.

Before the casing is sealed, the inflatable bladder 20 is inserted into it, with the bladder valve 22 projecting outwardly through an opening in the casing. In the embodiment illustrated in FIG. 6, the valve comprises a length of flexible tubing, of rubber or synthetic or thermoplastic material, attached to the bladder and provided with a pinch clamp 24 by which to releasably seal the tube. It will be understood that any desired form of valve may be employed, such as a conventional tire valve of well known construction.

After the bladder has been installed in the casing, the open end of the later is sealed by interconnecting the adjoining sections of the folded blank, in manner well known in the art. There is thus formed a cargo cushion which, during storage preliminary to use, is collapsible to the minimum thickness illustrated in FIG. 3.

As explained hereinbefore, the casing may be formed alternatively in the manner of a multi-wall paper bag. This form is illustrated in FIG. 7, wherein is shown a fragmentary section of a paper bag having three thicknesses of paper 26 encasing the bladder 20. The casing may be provided in the form illustrated in FIGS. 3–6, or in any other form and shape desired.

The inflatable cargo cushion of this invention is utilized in the following illustrated manner: Referring particularly to FIGS. 1 and 2 of the drawing, let it be assumed that it is desired to load the large packages 30 into a railroad freight car 32 having a central side opening. Two of the articles are loaded into the freight car against each of the opposite longitudinal ends of the latter, with the free space being located between each pair of articles (FIG. 2). One of the collapsed cargo cushions then is placed on end between each pair of articles, with the air valve 22 facing toward the center of the car. Since the casing is of sufficient lateral and longitudinal rigidity to maintain its vertical dimension, it need not be supported between the articles from an overhead suspension, but may simply rest upon the floor of the freight car. An airhose from a source of compressed air then is drawn into the car and attached to the valve. With the pinch clamp unloosened, air is admitted into the bladder, whereupon the casing is expanded from the collapsed condition illustrated in FIG. 3 to the desired condition of expansion illustrated in FIGS. 4 and 5. The pinch clamp then is tightened to seal the valve.

The innermost pairs of articles then are loaded into the freight car and the foregoing procedure repeated. The space between the innermost pairs of articles then is filled by one or more additional cargo cushions placed transversely of the car, as illustrated in FIG. 1.

Although the cargo cushions may be provided in any shape and size desired, it has been found convenient for railroad car use that the cushion be provided in the approximate size of four feet in width, six feet in height and eighteen inches in expanded thickness. With these dimensions it will be understood that the air pressure within the inflated bladder may be quite small, for example from four to ten pounds per square inch, and yet provide ample pressure for retaining the articles in place during transport. Moreover, any sudden shifting of the articles within the car in the direction to compress the cushion, will not increase the pressure in the bladder sufficiently to cause rupture of the cushion, for it has been determined that the end wall of the freight car will buckle before the cushion will rupture.

When the freight car and its contents have been transported to their destination, the transversely arranged cushions are deflated, by releasing the pinch clamp and then removed. The innermost longitudinally arranged cushions then are deflated and removed and the innermost pairs of articles unloaded. The outermost pair of cushions then are deflated and removed and the articles unloaded.

Since the cushions are constructed of an inexpensive bladder and an inexpensive casing, it may be discarded after this single use. However it may be convenient to return the cushion or the bladder component thereof to the shipper. If the bladder only is returned, it may be collapsed and folded to extremely small size, since it is made of thin wall rubber or thermoplastic material.

From the foregoing it will be apparent that the present invention provides a cargo cushion having many advantages. It is collapsible to minimum size for convenient storage and is manipulated with maximum facility for most efficient utilization. It is constructed of inexpensive materials and is therefore disposable after a single use, thereby avoiding the disadvantages of cost, return and accounting which are involved in the use of the reinforced rubber balloons proposed heretofore.

It will be apparent to those skilled in the art that various modifications and changes in the details of construction described hereinbefore may be made without departing from the spirit of this invention and the scope of the appended claims.

Having now described our invention and the manner in which the same may be used, what we claim as new and desire to secure by Letters Patent is:

1. A disposable cargo cushion comprising a hollow reinforcing casing of substantially rigid construction and including opposed face panels interconnected by lateral walls and constructed of strong fibrous sheet material, the lateral walls of the casing being constructed to fold along a plane substantially parallel to and between the face panels for lateral collapsing and expanding of the casing, a separate inflatable bladder of thin flexible material confined freely in the casing, at least one wall of the casing being capable of being open initially for installing the bladder in the casing and thereafter closed to confine the bladder in the casing, air valve means on the bladder extending through an opening in the casing for connection to a source of air under pressure for inflating the bladder and expanding the casing to fill a cargo space to be cushioned, the bladder being foldable with the casing for collapsing.

2. The cargo cushion of claim 1 wherein the bladder is made of substantially non-elastic synthetic thermoplastic material and is larger in inflated dimensions than the interior of the expanded casing.

3. The cargo cushion of claim 1 wherein the casing is made of a paper blank and wherein the lateral walls are folded along predetermined lines to form a transversely collapsible and expansible container.

4. The cargo cushion of claim 1 wherein the casing is made of a cardboard blank and wherein the lateral walls are folded along predetermined lines to form a transversely collapsible and expansible container.

References Cited in the file of this patent

UNITED STATES PATENTS

| | | |
|---|---|---|
| 1,708,260 | Coovert | Apr. 9, 1929 |
| 2,061,604 | Winterbauer | Nov. 24, 1936 |
| 2,307,902 | Vogt | Jan. 12, 1943 |
| 2,790,592 | Doyle | Apr. 30, 1957 |
| 2,856,867 | Dasey | Oct. 21, 1958 |
| 2,898,027 | Scholle | Aug. 4, 1959 |

FOREIGN PATENTS

| | | |
|---|---|---|
| 540,564 | Great Britain | Oct. 22, 1941 |